(12) United States Patent
Schoenhaber et al.

(10) Patent No.: US 12,188,392 B2
(45) Date of Patent: Jan. 7, 2025

(54) EXHAUST GAS SYSTEM FOR PURIFYING EXHAUST GASES OF GASOLINE ENGINE

(71) Applicant: UMICORE AG & CO. KG, Hanau-Wolfgang (DE)

(72) Inventors: Jan Schoenhaber, Darmstadt (DE); Joerg-Michael Richter, Frankfurt (DE); Carolin Braun, Langen (DE); Tim Palm, Ronneburg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 18/580,561

(22) PCT Filed: Jul. 20, 2022

(86) PCT No.: PCT/EP2022/070285
§ 371 (c)(1),
(2) Date: Jan. 18, 2024

(87) PCT Pub. No.: WO2023/001863
PCT Pub. Date: Jan. 26, 2023

(65) Prior Publication Data
US 2024/0318588 A1    Sep. 26, 2024

(30) Foreign Application Priority Data
Jul. 21, 2021  (DE) .......................... 102021118802.4

(51) Int. Cl.
*F01N 3/00*  (2006.01)
*F01N 3/08*  (2006.01)
(Continued)

(52) U.S. Cl.
CPC ....... *F01N 13/0093* (2014.06); *F01N 3/0828* (2013.01); *F01N 3/101* (2013.01); *F01N 2370/04* (2013.01); *F01N 2570/18* (2013.01)

(58) Field of Classification Search
CPC .... F01N 13/0093; F01N 3/0828; F01N 3/101; F01N 2370/04; F01N 2570/18
See application file for complete search history.

(56) References Cited

U.S. PATENT DOCUMENTS

| 5,120,695 A | 6/1992 | Blumrich et al. |
| 6,468,941 B1 | 10/2002 | Bortun et al. |

(Continued)

FOREIGN PATENT DOCUMENTS

| DE | 10023439 A1 | 11/2001 |
| DE | 102010046762 A1 | 3/2011 |

(Continued)

OTHER PUBLICATIONS

U.S. Appl. No. 18/580,496, Schoenhaber et al., filed Jan. 18, 2024.
(Continued)

*Primary Examiner* — Matthew T Largi
(74) *Attorney, Agent, or Firm* — Smith, Gambrell & Russell, LLP

(57) ABSTRACT

The invention is directed to the purification of exhaust gases of an internal combustion engine operated predominantly with a stoichiometric fuel mixture. The exhaust system has in particular 4 purification functions in a particular order. A three-way catalyst (TWC1) near the engine is followed by a gasoline particle filter (GPF) and another three-way catalyst (TWC2) downstream thereof. The system additionally includes an ammonia storage function.

8 Claims, 3 Drawing Sheets

Figure 1:
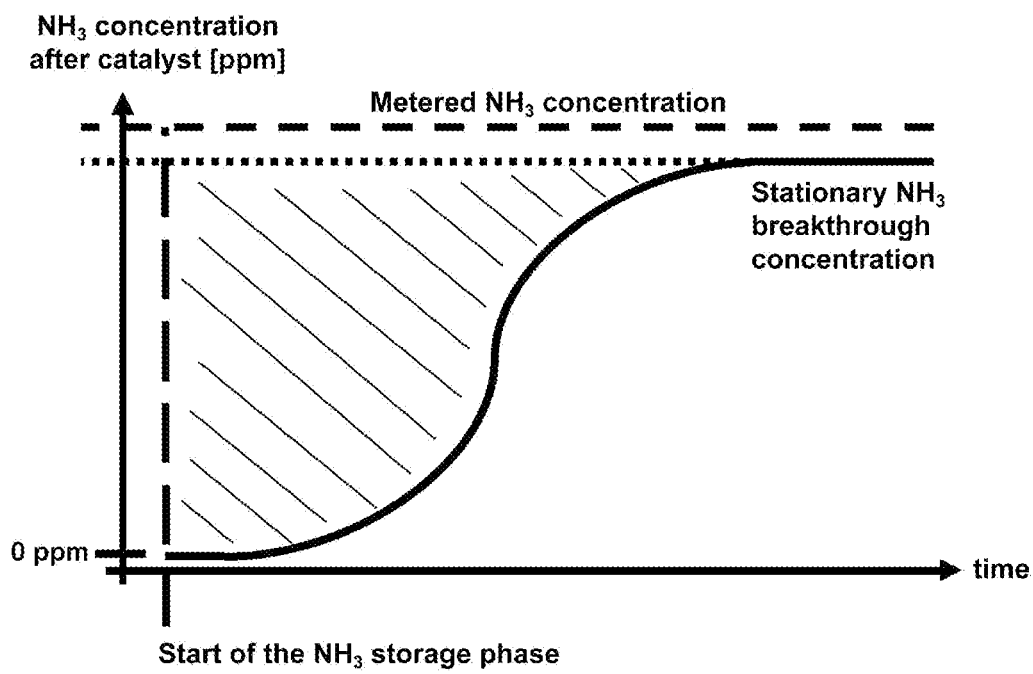

(51) Int. Cl.
*F01N 3/10* (2006.01)
*F01N 13/00* (2010.01)

(56) References Cited

U.S. PATENT DOCUMENTS

| | | | |
|---|---|---|---|
| 6,585,944 | B1 | 7/2003 | Nunan et al. |
| 6,729,129 | B2 | 5/2004 | Yamamoto et al. |
| 6,938,411 | B2 | 9/2005 | Hoffmann et al. |
| 7,984,609 | B2 | 7/2011 | Döring et al. |
| 8,066,963 | B2 | 11/2011 | Klingmann et al. |
| 8,158,551 | B2 | 4/2012 | Verdier et al. |
| 8,277,880 | B2 | 10/2012 | Sato et al. |
| 8,341,947 | B2 | 1/2013 | Hepburn et al. |
| 8,398,943 | B2 | 3/2013 | Döring et al. |
| 8,464,522 | B2 * | 6/2013 | Fujiwara ............. F02D 41/029 60/285 |
| 8,617,497 | B2 | 12/2013 | Adelmann et al. |
| 8,663,588 | B2 | 3/2014 | Lindner et al. |
| 8,776,500 | B2 | 7/2014 | Gonze et al. |
| 9,517,462 | B2 | 12/2016 | Roesch et al. |
| 9,957,911 | B2 | 5/2018 | Sczomak et al. |
| 10,066,576 | B2 | 9/2018 | Gwidt et al. |
| 10,072,549 | B2 | 9/2018 | Inaguma et al. |
| 10,279,313 | B2 | 5/2019 | Gabrielsson |
| 10,323,593 | B2 | 6/2019 | Ball et al. |
| 10,413,886 | B2 | 9/2019 | Despres et al. |
| 10,914,217 | B2 | 2/2021 | Joo et al. |
| 11,073,057 | B2 | 7/2021 | Joo et al. |
| 11,179,676 | B2 | 11/2021 | Schoenhaber et al. |
| 11,185,820 | B2 | 11/2021 | Schoenhaber et al. |
| 11,220,942 | B2 | 1/2022 | Hupfeld et al. |
| 11,291,952 | B2 | 4/2022 | Schoenhaber et al. |
| 11,305,269 | B2 | 4/2022 | Deibel et al. |
| 2001/0006934 | A1 | 7/2001 | Kachi et al. |
| 2004/0101453 | A1* | 5/2004 | Fujiwara ............. F01N 3/0814 422/177 |
| 2005/0282698 | A1 | 12/2005 | Southward et al. |
| 2006/0010857 | A1 | 1/2006 | Hu et al. |
| 2009/0193796 | A1 | 8/2009 | Wei et al. |
| 2010/0107606 | A1 | 5/2010 | Narayanaswamy et al. |
| 2011/0072784 | A1 | 3/2011 | Hepburn et al. |
| 2011/0073088 | A1 | 3/2011 | Hubbard et al. |
| 2011/0120089 | A1* | 5/2011 | Koch .................. F01N 3/035 60/297 |
| 2011/0202253 | A1* | 8/2011 | Perry ................. F01N 3/035 60/274 |
| 2011/0271664 | A1 | 11/2011 | Boorse et al. |
| 2015/0107228 | A1* | 4/2015 | Klingmann .......... B01D 53/945 60/297 |
| 2015/0132188 | A1 | 5/2015 | Howard |
| 2015/0266002 | A1 | 9/2015 | Biberger et al. |
| 2016/0051931 | A1* | 2/2016 | Ito .................... B01D 53/9418 422/180 |
| 2016/0228852 | A1* | 8/2016 | Biberger ............. B01J 37/0244 |
| 2016/0245207 | A1* | 8/2016 | Ball ..................... F01N 3/101 |
| 2017/0014766 | A1* | 1/2017 | Schoenhaber ........ F01N 3/0814 |
| 2017/0274321 | A1* | 9/2017 | Zheng ................. B01J 37/0244 |
| 2018/0038252 | A1* | 2/2018 | Yang .................. B01D 53/9422 |
| 2018/0080357 | A1* | 3/2018 | Jung .................... F01N 3/035 |
| 2018/0230882 | A1 | 8/2018 | Ghoniem et al. |
| 2018/0318763 | A1 | 11/2018 | Biberger et al. |
| 2018/0347425 | A1* | 12/2018 | Otsuka ............... B01D 46/2482 |
| 2019/0120109 | A1 | 4/2019 | Clark et al. |
| 2019/0351393 | A1 | 11/2019 | Nunan et al. |
| 2019/0351397 | A1 | 11/2019 | Nunan et al. |
| 2019/0351398 | A1 | 11/2019 | Nunan et al. |
| 2019/0353067 | A1 | 11/2019 | Moser et al. |
| 2020/0157995 | A1 | 5/2020 | Paukner et al. |
| 2020/0378286 | A1 | 12/2020 | Hengst et al. |
| 2021/0162382 | A1 | 6/2021 | Hengst et al. |
| 2021/0236976 | A1 | 8/2021 | Foerster et al. |
| 2022/0168721 | A1 | 6/2022 | Schoenhaber et al. |
| 2022/0176355 | A1 | 6/2022 | Kucerova et al. |
| 2022/0176364 | A1 | 6/2022 | Schoenhaber et al. |

FOREIGN PATENT DOCUMENTS

| | | |
|---|---|---|
| DE | 102013211387 A1 | 12/2013 |
| DE | 102017102393 A1 | 8/2017 |
| DE | 102016112657 A1 | 1/2018 |
| DE | 102018108346 A1 | 10/2019 |
| DE | 102019204744 A1 | 8/2020 |
| DE | 102019219115 A1 | 6/2021 |
| EP | 0 324 082 A1 | 7/1989 |
| EP | 0 885 650 A2 | 12/1998 |
| EP | 1 046 423 A2 | 10/2000 |
| EP | 1 541 220 A1 | 6/2005 |
| EP | 1 657 410 A1 | 5/2006 |
| EP | 1 726 359 A1 | 11/2006 |
| EP | 1 876 331 A2 | 1/2008 |
| EP | 1 882 832 A2 | 1/2008 |
| EP | 1 892 395 A1 | 2/2008 |
| EP | 1 921 044 A2 | 5/2008 |
| EP | 2 007 682 A1 | 12/2008 |
| EP | 2 042 226 A2 | 4/2009 |
| EP | 1 974 809 B1 | 9/2010 |
| EP | 1 900 416 B1 | 4/2011 |
| EP | 3 045 226 A1 | 7/2016 |
| EP | 3 247 493 A1 | 11/2017 |
| EP | 3 298 252 A1 | 3/2018 |
| EP | 3 536 919 A1 | 9/2019 |
| EP | 3 595 796 A1 | 1/2020 |
| EP | 3 484 602 B1 | 2/2020 |
| EP | 3 639 908 A1 | 4/2020 |
| EP | 3 639 919 A1 | 4/2020 |
| EP | 3 695 902 A1 | 8/2020 |
| EP | 3 642 460 B1 | 2/2021 |
| WO | 95/35152 A1 | 12/1995 |
| WO | 2004/076829 A1 | 9/2004 |
| WO | 2008/000449 A2 | 1/2008 |
| WO | 2009/012348 A1 | 1/2009 |
| WO | 2011/110919 A1 | 9/2011 |
| WO | 2011/131324 A1 | 10/2011 |
| WO | 2012/135871 A1 | 10/2012 |
| WO | 2012/175409 A1 | 12/2012 |
| WO | 2015/121910 A1 | 8/2015 |
| WO | 2016/057285 A1 | 4/2016 |
| WO | 2017/082563 A1 | 5/2017 |
| WO | 2017/153239 A1 | 9/2017 |
| WO | 2018/069199 A1 | 4/2018 |
| WO | 2008/106518 A2 | 9/2018 |
| WO | 2008/106519 A1 | 9/2018 |
| WO | 2019/121375 A1 | 6/2019 |
| WO | 2019/121994 A1 | 6/2019 |
| WO | 2019/121995 A1 | 6/2019 |
| WO | 2019/134958 A1 | 7/2019 |
| WO | 2020/058265 A1 | 3/2020 |
| WO | 2020/069548 A1 | 4/2020 |
| WO | 2020/200394 A1 | 10/2020 |
| WO | 2020/200397 A1 | 10/2020 |
| WO | 2020/200398 A1 | 10/2020 |
| WO | 2023/001617 A1 | 1/2023 |
| WO | 2023/001865 A1 | 1/2023 |

OTHER PUBLICATIONS

U.S. Appl. No. 18/580,581, Schoenhaber et al., filed Jan. 18, 2024.
Lupescu. Jason, et al. A New Catalyzed HC Trap Technology that Enhances the Conversion of Gasoline Fuel Cold-Start Emissions. SAE Int. J. Fuels Lubr 2018. vol. 11(4), pp. 411-425.
International Search Report dated Nov. 3, 2022 for International Patent Application No. PCT/EP2022/070285 (4 pages in German; 3 pages English translation).
Written Opinion of the International Searching Authority dated Nov. 3, 2022 for International Patent Application No. PCT/EP2022/070285 (6 pages in German).
DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorp-

(56) References Cited

OTHER PUBLICATIONS tion Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
Meier, W.M. Zeolites and zeolite-like materials. Pure and Applied Chemistry. 1986. vol. 58, No. 10, pp. 1323-1328.
Notice of Allowance mailed Aug. 20, 2024 for U.S. Appl. No. 18/580,496 (8 pages).
Non Final Office Action mailed Aug. 26, 2024 for U.S. Appl. No. 18/580,581 (14 pages).
Non Final Office Action mailed Jul. 18, 2024 in U.S. Appl. No. 18/580,496 (12 pages).
Translation of the Written Opinion of the International Searching Authority mailed Nov. 3, 2022 for International Patent Application No. PCT/EP2022/070285 (7 pages).
International Preliminary Report on Patentability mailed Jan. 18, 2024 for International Patent Application No. PCT/EP2022/070285 (7 pages in German; 8 pages English translation).

* cited by examiner

EXHAUST GAS SYSTEM FOR PURIFYING EXHAUST GASES OF GASOLINE ENGINE

The present invention is directed to the purification of exhaust gases of an internal combustion engine operated predominantly with a stoichiometric fuel mixture. The exhaust system has in particular 4 purification functions in a particular order. A three-way catalyst (TWC1) near the engine is followed by a gasoline particle filter (GPF) and another TWC2 downstream thereof. The system additionally includes an ammonia storage function.

Exhaust gases from internal combustion engines operated with predominantly (>50% of the operating time) stoichiometric air/fuel mixture, i.e., Otto engines powered by gasoline or natural gas, are purified in conventional methods using three-way catalysts (TWC). Such catalysts are capable of simultaneously converting the three main gaseous pollutants of the engine, namely hydrocarbons, carbon monoxide and nitrogen oxides, into harmless components. "Stoichiometric" means that on average exactly as much air is available for combustion of the fuel present in the cylinder as is required for complete combustion. The combustion air ratio A (A/F ratio; air/fuel ratio) sets the air mass $m_{L,actual}$ which is actually available for combustion in relation to the stoichiometric air mass $m_{L,st}$.

$$\lambda = \frac{m_{L,actual}}{m_{L,st}}$$

If $\lambda<1$ (e.g., 0.9), this means "air deficiency" and one speaks of a rich exhaust gas mixture; $\lambda>1$ (e.g., 1.1) means "excess air" and the exhaust gas mixture is referred to as lean. The statement $\lambda=1.1$ means that 10% more air is present than would be required for the stoichiometric reaction.

The catalytically active materials used in the three-way catalysts are usually platinum group metals, in particular platinum, palladium and rhodium, which are present, for example, on γ-aluminum oxide as a support material. In addition, three-way catalysts contain oxygen storage materials, e.g., cerium/zirconium mixed oxides. In the latter case, cerium oxide, a rare earth metal oxide, constitutes the component that is fundamental to the oxygen storage. Along with zirconium oxide and cerium oxide, these materials may contain additional components, such as further rare earth metal oxides or alkaline earth metal oxides. Oxygen storage materials are activated by applying catalytically-active materials, such as platinum group metals, and therefore also serve as support material for the platinum group metals.

Such catalytically active materials together with ingredients are applied to, for example, flow-through substrates by a coating process. After drying and calcining the substrates, they can be installed in the exhaust system. Flow-through substrates are made of ceramic materials, such as silicon carbide, aluminum titanate, and cordierite, and have been proven to be useful for a long time. They are composed of a large number of parallel channels formed by porous walls. The channels are open at both ends of the flow-through substrate. The exhaust gas thus flows from the inlet region to the outlet region and in the process contacts the catalytically active material applied to the walls.

In addition to the gaseous pollutants, the exhaust gas of such internal combustion engines also contains very fine particles (PM) which result from the incomplete combustion of the fuel and substantially consist of soot. In contrast to the particle emission of diesel engines, the particles in the exhaust gas of stoichiometrically operated internal combustion engines, such as Otto engines, are very small and have an average particle size of less than 1 μm. Typical particle sizes range from 10 to 200 nm. Furthermore, the quantity of particles emitted is very low and ranges from 2 to 4 mg/km.

In the field of purifying exhaust gas from lean-burn engines, i.e., in particular diesel engines, particle filters made of ceramic materials, such as silicon carbide, aluminum titanate and cordierite, have long proven themselves. These particle filters are made up of a large number of parallel channels formed by porous walls. The channels are alternately closed at one of the two ends of the filter so that channels A, which are open at the first side of the filter and closed at the second side of the filter, and channels B, which are closed at the first side of the filter and open at the second side of the filter, are formed. For example, exhaust gas flowing into channels A can only leave the filter via channels B and must flow through the porous walls between channels A and B for this purpose. When the exhaust gas passes through the wall, the particles are retained and the exhaust gas is cleaned. Such aggregates are referred to as wall-flow filters.

The particles retained in this manner must subsequently be burnt off or oxidized in order to prevent a clogging of the filter or an unacceptable increase in the back pressure of the exhaust system. For this purpose, for example, the wall-flow filter can be provided with catalytically active coatings that reduce the ignition temperature of soot. Applying such coatings to the porous walls between the channels (so-called on-wall coating) or introducing them into the porous walls (so-called in-wall coating) is already known. EP1657410A2 also already describes a combination of both coating types; that is, part of the catalytically active material is present in the porous walls and another part is present on the porous walls.

The concept of removing particles from exhaust gas by means of wall-flow filters has already been applied to the purification of exhaust gas from internal combustion engines operated with a stoichiometric air/fuel mixture; see, for example, EP2042226A2 (gasoline particle filter; GPF). According to its teaching, a wall-flow filter comprises two layers arranged one above the other, wherein one can be arranged in the porous wall and the other can be arranged on the porous wall.

Since the Euro 6c stage took effect in September 2017, European emissions legislation has required exhaust gas measurements to be carried out under real driving conditions on the road (Real Driving Emissions; RDE). Depending upon driving conditions, this can mean that the catalyst will have to meet much higher demands-particularly with respect to the dynamic conversion of carbon monoxide and nitrogen oxides. In the currently valid exhaust emission standards, pollutants such as HC, CO, NOx and particles must also comply with the limits of the Euro 6d standard under RDE conditions for all new vehicles. In addition, a certain $CO_2$ fleet limit should not be exceeded. Future emissions standards in Europe and the world will certainly place even more demanding requirements on internal combustion engines and their exhaust gas treatment.

It can be assumed that simple catalysts and/or filters will no longer be sufficient for such standards. Therefore, more complex exhaust systems will also have to be introduced in the field of predominantly stoichiometrically operated internal combustion engines. By way of example, reference is made to EP3639919A1, in which an exhaust gas system consisting of a first TWC followed by a GPF and another TWC downstream of the GPF was proposed. By means of these systems, it must then be ensured that sufficient catalytic activity and filtration efficiency are combined with the lowest possible exhaust gas back pressure. In particular, the exhaust gas back pressure of a corresponding system leads to an increased consumption of fuel, which has a negative effect on the $CO_2$ performance. In addition, future emissions standards will increasingly focus on secondary emissions such as toxic $NH_3$ or climate-damaging $N_2O$. A future exhaust system should be able to address all these aspects.

There is therefore still a need for exhaust gas purification systems for internal combustion engines operated predominantly with stoichiometric fuel mixtures, which are capable of eliminating all required harmful components of the exhaust gas of these engines in the highest possible manner and in this process require the lowest possible additional fuel consumption.

These and further objects arising from the prior art for the person skilled in the art are solved by an exhaust system according to the present invention. As a result of the fact that, in an exhaust gas purification system for purifying exhaust gases of a predominantly stoichiometrically operated internal combustion engine having a TWC1 near the engine on a flow-through substrate, a GPF which is attached downstream to the TWC1 as a wall-flow filter, and downstream to the GPF another TWC2 on a flow-through substrate, the system is modified in such a way that it additionally has materials for temporary storage of ammonia, the solution to the problem is achieved in an extremely surprising and advantageous manner.

According to the invention, the term "temporary" is understood to mean that the material can store ammonia in certain operating states of the exhaust gas system and, inter alia, release it again or no longer absorb it. The storage material itself is not changed by this. For example, the material can store the ammonia formed in the system at low temperatures and release or convert it again at elevated temperatures (see further below). The storage material is then available again for further storage of ammonia.

The establishment of a material for storing ammonia in the system shown above represents an optimal combination of four functional exhaust gas purification components which will allow future exhaust gas limits to be met and, in addition, opens up the possibility of realizing a high level of pollutant reduction in the system. The additional storage function allows ammonia produced by the over-reduction of nitrogen oxides to be captured and stored in the system. Thus, it does not reach the environment. If the operating conditions of the exhaust gas purification system permit, the ammonia is desorbed and oxidized to nitrogen, for example, via a TWC.

The mode of operation of the ammonia storage function is based on the fact that it can temporarily store ammonia in operating states of the exhaust gas purification system in which ammonia is generated, but cannot be converted by conventional three-way catalysts, for example due to lack of oxygen or insufficient operating temperature. The ammonia stored in this way can then be removed when the operating state of the exhaust gas purification system changes and subsequently or directly converted, for example if there is enough oxygen present.

The storage capability of the catalyst substrate for ammonia can be determined in accordance with the procedure mentioned further below. The ammonia storage capability or capacity addressed in the context of this invention is given as a quotient of the stored mass of ammonia per liter of catalyst substrate volume. Due to the additional material for temporary storage of ammonia, the ammonia storage capability of the exhaust gas purification system should be increased to at least 0.25 g ammonia per L of substrate volume (measured in the fresh state). Overall, the storage capacity of the ammonia storage components used should be sufficient so that between 0.25 and 10.0 g of $NH_3$ per liter of substrate volume, preferably between 0.5 and 8.0 g $NH_3$ per liter of substrate volume, and particularly preferably between 0.5 and 5.0 g of $NH_3$ per liter of substrate volume of ammonia, can be stored in the system (always based on the fresh condition). These materials temporarily storing ammonia are present in sufficient quantities in the exhaust system. A preferred quantity has been found to be 50-350 g/l, preferably 75-300 g/l, and most preferably 100-250 g/l substrate volume. The volume of the substrate on which the storage material is located is used as the substrate volume.

Materials familiar to the person skilled in the art can be used for temporary storage of ammonia. These are preferably zeolites, such as mordenites (MOR), Y-zeolites (FAU), ZSM-5 (MFI), ferrierites (FER), chabazites (CHA), AEI, LEV, and β-zeolites (BEA), as well as zeolite-like materials such as aluminum phosphates (AlPO) and silicon aluminum phosphate (SAPO) or mixtures thereof (EP0324082A1). Materials that have proven to be particularly advantageous for use in the storage of $NH_3$ are named in US2006/0010857AA and WO2004076829A1, respectively. Particularly preferably used are ZSM-5 (MFI), chabazite (CHA), levyn (LEV), ferrierite (FER), SAPO-34, and β-zeolites (BEA). Very particularly preferably used are CHA, LEV, BEA and AlPO-34 or SAPO-34. Extremely preferably used are materials of the CHA type or the BEA type. In order to ensure improved storage activity, these materials are preferably provided with transition metals from the group consisting of iron, copper, manganese and silver. Copper and iron are particularly advantageous in this context. The person skilled in the art knows how the zeolites or zeolite-like materials are provided with the transition metals (PCT/EP2012/061382, and the literature cited therein) in order to be able to provide good activity with respect to the reduction of nitrogen oxides with ammonia.

The term "zeolite" refers to porous materials with a lattice structure of corner-connected $AlO_4$ und $SiO_4$ tetrahedrons according to the general formula (W. M. Meier, *Pure & Appl. Chem.*, Vol. 58, No. 10, pp. 1323-1328, 1986):

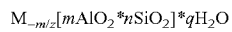

$$M_{-m/z}[mAlO_2*nSiO_2]*qH_2O$$

Thus, the structure of a zeolite consists of a grid that is made of tetrahedrons and surrounds channels and cavities. A distinction is made between naturally occurring and synthetically produced zeolites.

In the context of this document, the term "zeolite-like compound" is understood to mean a compound that has the same structural type as a naturally occurring or synthetically produced zeolite compound, but which differs from such compounds in that the corresponding cage structure is not composed exclusively of aluminum and silicon framework atoms. In such compounds, the aluminum and/or silicon backbone atoms are proportionately replaced by other trivalent, tetravalent, or pentavalent backbone atoms, such as B(III), Ga(III), Ge(IV), Ti(IV), or P(V). The most common method used in practice is the replacement of aluminum and/or silicon framework atoms by phosphorus atoms, for example in the silicon aluminum phosphates or in the aluminum phosphates, which crystallize in zeolite structure types. Prominent examples are the silicon aluminum phosphate SAPO-34 crystallized in chabazite structure and the aluminum phosphate AlPO-34 crystallized in chabazite structure.

The particular advantage of the use of transition metal-exchanged zeolites or zeolite-like compounds according to the invention is the possibility that these substances are at the same time capable of comproportioning nitrogen oxides present in the exhaust gas and the stored ammonia to nitrogen. In this case, the ammonia store acts as a catalyst for selective reduction (WO2008106518A2). Furthermore, it can be advantageous if a function for oxidizing ammonia to nitrogen is also added to this SCR catalyst (WO2008106519A1). It is therefore advantageous that the materials for temporary storage of ammonia also have catalysts for the oxidation of $NH_3$ to $N_2$. As such, the present catalyst is then an ammonia oxidation catalyst (AMOX) or an ammonia barrier catalyst (U.S. Pat. No. 5,120,695; EP1892395A1; EP1882832A2; EP1876331A2; WO12135871A1; US2011271664AA; WO11110919A1). If there are not enough nitrogen oxides in the system to oxidize the stored ammonia, the ammonia can also be converted into nitrogen with the oxygen present via the AMOX. In both cases—as SCR catalyst or AMOX-no ammonia is released into the environment.

The material temporarily storing the ammonia can be distributed in the exhaust gas purification system to one or the units already present. Here, the corresponding material can be present in relation to the catalytically active materials which may already be present, either associated with them or separated from them in zones or layers on one or more substrates. As such, it is appropriate to locate the material temporarily storing the ammonia predominantly on the TWC2. If ammonia should be formed in the TWC1 or GPF aggregates in the system, it can be stored or converted accordingly on the TWC2 positioned downstream. Since the TWC2 is correspondingly further removed from the engine outlet, the temperature load here is more moderate, which promotes better storage.

However, alternatively but preferably, the material temporarily storing the ammonia may be arranged on a separate flow-through substrate. In this case, this flow-through substrate (KAT) can be arranged in the exhaust gas purification system according to aspects known to a person skilled in the art (see FIG. 2-4). In one possible arrangement, the KAT is arranged downstream to the TWC2. The advantages are the same as those mentioned above for locating the corresponding material on the TWC2. Thus, the KAT-like the TWC2—is preferably located in the underbody of the vehicle. Alternatively, however, the KAT can also be located upstream of the TWC2 and downstream of the TWC1 and in front of or behind the GPF. In particular, in this last-mentioned combination, it appears to be advantageous if the KAT is arranged at a distance of 30-250 cm, preferably 40-200 cm and most preferably 50-180 cm downstream of the outlet of the TWC1.

In general, it has proven to be advantageous if the individual substrates of the exhaust gas purification system according to the invention (TWC1, GPF, TWC2, KAT) are in a certain ratio to one another with regard to the size of the volume that they occupy. Thus, it is advantageous if the TWC1 occupies a fraction of the volume of the total system which is between 20 and 50% by volume, preferably 30-40% by volume. The GPF should have a volume fraction of 20-60% by volume, preferably 25-55% by volume, based on the total system. Likewise, the fraction of TWC2 in the total system should be 10-40% by volume, preferably 15-35% by volume. The cat comprising the material for temporary storage of nitrogen oxides has a fraction of preferably 5-30% by volume, more preferably 10-30% by volume, of the total volume of substrates in the exhaust gas purification system. Total system here is understood to mean the sum of the volumes calculated from the external dimensions of the substrates of TWC1, GPF, TWC2 and KAT.

The KAT has a relatively high washcoat loading in g/L, which ranges from 100-500 g/L, preferably 125-450 g/L, and most preferably 150-400 g/L. In one embodiment, the structure of the KAT corresponds to that of an SCR catalyst or preferably to that of an AMOX catalyst as already described above. The latter has an oxidation function in order to be able to oxidize ammonia in the exhaust gas to nitrogen. In such catalysts, it has proven to be advantageous if they are present in a zoned and/or layered structure. For example, it has been found to be advantageous if the KAT has an at least partially lower layer deposited on the substrate with an oxidation function for the oxidation of $NH_3$ to $N_2$ and has, on this layer, at least partially another layer with the material temporarily storing ammonia. The layer temporarily storing ammonia can be designed in the form of an SCR catalyst as shown above. Zeolites of CHA, BEA or AEI which have been transition metal exchanged with copper or iron have proven to be particularly advantageous in this respect. The oxidation coating substantially has the metals Rh, Pt and/or Pd, which are preferably supported on high surface area active aluminum. Active aluminum contains up to 10% by weight, based on the aluminum oxide, of lanthanum and/or $SiO_2$ as admixture. The loading ratio of the temporarily ammonia-storing coating to the oxidative coating should be between 10:1 to 1:10, more preferably 9:1-1:9, and most preferably between 8:1 and 1:8. This and the choice of noble metals allow the oxidative effect of the oxidative coating to be well balanced with respect to the reducing effect of the temporarily ammonia-storing layer in order to preferably be able to generate nitrogen and to avoid over-oxidation of the ammonia into climate-damaging nitrous oxide.

It may also be advantageous if materials capable of storing oxygen are also added to the materials temporarily storing ammonia on the KAT. The latter are the oxygen storage materials which are usually used in the TWCs. These have the effect of providing a more oxygen-rich environment, which is beneficial for the oxidation of ammonia. Corresponding materials are described, inter alia, in EP2007682A1, EP1921044A2, U.S. Pat. No. 6,468,941B1, U.S. Pat. No. 6,585,944B1 and US20050282698A1. Preferably, cerium oxides, cerium-zirconium mixed oxides or cerium or cerium-zirconium mixed oxides doped with La, Y, Pr, Nd are considered in this respect. The amount of oxygen-storing material can be measured by a person skilled in the art, but should not be used below 0.05 g/g, preferably 0.1 g/g, based on the weight of the material temporarily storing ammonia.

TWC1 and TWC2 are modern three-way catalysts. A person skilled in the art knows which one would be used for the present purpose (see, for example, WO2019121994A1, WO2019121995A1, WO9535152A1, WO2008000449A2, EP0885650A2, EP1046423A2, EP1726359A1, EP1541220A1, EP1900416B1, EP3045226A1, WO2009012348A1, and EP1974809B1). Three-way catalysts essentially consist of the components precious metal, high-surface-area carrier oxide and oxygen storage material. The oxygen storage materials are in particular those in which cerium/zirconium/rare earth metal mixed oxides occur. Rare earth metal oxides that may be considered include lanthanum oxide, yttrium oxide, praseodymium oxide, neodymium oxide, samarium oxide, and mixtures of one or more of these metal oxides. Lanthanum oxide, yttrium oxide, neodymium oxide, and mixtures of one or more of these metal oxides are preferred. Particularly preferred are lanthanum oxide, yttrium oxide and most preferred is a mixture of lanthanum oxide and yttrium oxide in this context.

High-surface-area, temperature-stable oxides are considered by those skilled in the art as carrier oxides for catalytically active metals. These are usually aluminum oxides, silicon oxides, zirconium oxides, or titanium oxides, or mixtures thereof. Active aluminum oxide in particular is known to a person skilled in the art in this context. In particular, it denotes γ-aluminum oxide with a surface of 100 to 200 m$^2$/g. Active aluminum oxide is frequently described in the literature and is commercially available. It usually contains silicon oxide or lanthanum oxide as a stabilizer in an amount of up to 10% by weight based on the aluminum oxide. Three-way catalysts for the most part contain platinum group metals such as Pt, Pd, and Rh as catalytically active components, with Pd and Rh being particularly preferred. The catalytically active metals are often deposited in a highly disperse manner on the high surface area oxides and the oxygen storage materials. It is particularly preferred for the precious metals to be pre-fixed on the oxygen storage material before it is mixed with the other components into the coating mixture. Zoned or layered embodiments are now the norm for TWCs. In a preferred embodiment, at least the TWC1 has a 2-layer structure with two different three-way coatings, preferably as described in EP3247493A1.

The three-way catalysts are preferably applied to a flow-through substrate by a coating step familiar to the person skilled in the art. Flow-through substrates are catalyst carrier commonly used in the prior art, which can consist of metal (corrugated carrier, for example WO17153239A1, WO16057285A1, WO15121910A1 and literature cited therein) or ceramic materials. Refractory ceramics, such as cordierite, silicon carbide or aluminum titanate, etc., are preferably used. The number of channels per area is characterized by the cell density, which typically ranges between 300 and 900 cells per square inch (cpsi). The wall thickness of the channel walls is between 0.5-0.05 mm for ceramics.

According to the invention, the TWC1 is preferably installed near the engine. This means that there is only a distance of 1-40 cm between the turbocharger and the inlet-side face of the TWC1. Preferably, the catalyst TWC1 is installed 2-30 cm and most preferably 3-20 cm from the turbocharger. The GPF can be installed at a distance from the TWC1, for example in the underbody of the vehicle. However, the embodiment in which the GPF is installed rather close to the outlet-side end of the TWC1 is preferred. Preferably, the distance between the outlet-side face of the TWC1 and GPF is 1-60 cm, more preferably 2-50 cm, and most preferably 3-40 cm.

The TWC2 is either installed directly after the filter in a position near the engine, or is preferably used in the underbody of the vehicle in the exhaust system. As a result, the temperature load of this TWC is a different than that of TWC1. For this reason, the two TWCs differ from one another in some characteristics. Preferably, the TWC2 has a lower washcoat loading than the TWC1, in particular by a factor of between 1.25-4, more preferably 1.5-3. Preferably, the TWC1 consists of at least 2-4 different three-way catalyst layers or zones, while the TWC2 preferably consists of at least 1-2 three-way catalyst layers or zones. The TWCs have a common washcoat loading. The washcoat loading is preferably 100-400 g/L, more preferably 125-375 g/L, and most preferably 150-325 g/L. In a further embodiment, it has proven to be advantageous if the washcoat loading in g/L of TWC1 is greater than that of TWC2, in particular by a factor of between 1.25-4, more preferably 1.5-3. In addition, the noble metal concentration in g/L on TWC1 is preferably greater than on TWC2, in particular by a factor of 1.25-20, more preferably 1.5-10.

The GPF has the form of a wall-flow filter. All ceramic materials customary in the prior art can be used as wall-flow filters. Porous wall-flow filter substrates made of cordierite, silicon carbide, or aluminum titanate are preferably used. These wall-flow filter substrates have inflow and outflow channels, wherein the respective downstream ends of the inflow channels and the upstream ends of the outflow channels are alternately closed off with gas-tight "plugs." The exhaust gas that is to be purified and that flows through the filter substrate is thereby forced to pass through the porous wall between the inflow channel and outflow channel, which delivers an excellent particulate filtering effect. The filtration property for particulates can be designed by means of the porosity, pore/radii distribution, and thickness of the wall. The porosity of the wall-flow filters is usually more than 40%, generally from 40% to 75%, and particularly from 45% to 70%[as measured in accordance with DIN 66133, latest version on the filing date]. The average pore size (diameter) is at least 3 μm—for example, from 3 μm to 34 μm, preferably more than 5 μm, and in particular from 5 μm to 28 μm, or from 7 μm to 22 μm [measured in accordance with DIN 66134, latest version on the date of application].

The GPF can be used uncoated, with a dry powder coating or provided with an additional, possibly wet-manufactured coating in the system according to the invention (EP3595796A1, WO2020200394A1, WO2020200397A1). Corresponding wet-manufactured filters with improved filtering effect are presented in WO2019121375A1 or WO2020200398A1. Alternatively or cumulatively, coating with a dry powder can also be considered (see, for example, DE102018108346A1, U.S. Pat. No. 8,277,880B2). First and foremost, such coatings improve the filtration efficiency of the filter without unduly worsening the exhaust gas back pressure of the filter. However, the GPF can also accommodate a catalytic coating. A catalyst material can be applied in the form of a coating suspension onto and/or into the porous walls of the inflow and/or outflow channels. In the present case, this is usually a coating with a three-way catalyst. The composition corresponds to the statements made above. Thus, all units in the exhaust gas purification system according to the invention can have catalytically active noble metals of the provenance specified above. In an advantageous embodiment, the GPF has a higher noble metal concentration in g/L substrate volume than the TWC2. If present, the KAT has a lower noble metal concentration in g/L substrate volume than the TWC2. However, depending on the application, both embodiments mentioned can also occur reciprocally. In a particular case, the TWC2 may be designed such that it only has rhodium as a noble metal.

If the GPF is provided with a coating, the washcoat loading is 10-200 g/L, preferably 20-175 g/L, and most preferably 25-150 g/L. It is advantageous here if the substrate with the materials for temporary storage of ammonia (KAT) has a greater washcoat loading in g/L than the GPF.

"Electrically heated catalyst" (EHC) are special catalyst bodies which can be heated by applying a power source. The advantage of such systems is that operating states of the exhaust gas purification system are avoided in which the catalysts are not or are no longer sufficiently active due to low temperatures. Such operating states substantially exist when the vehicle has been started only recently. By rapid electrical heating of the catalyst substrates, the catalysts located thereon can be brought to conversion temperature and thus the emission of unconverted pollutants can be reduced. In the present case, it is particularly advantageous if at least one of the catalyst substrates (TWC1, GPF, TWC2 or KAT) present in the system is an electrically heatable substrate. It is very preferred if this is the TWC1. Due to its positioning in the system, this is first to reach working temperature. Therefore, the use of electricity is lowest here, which is extremely preferable, especially with regard to hybrid applications, as the battery can be conserved. Corresponding EHC systems in hybrid vehicles are known to a person skilled in the art (U.S. Pat. No. 8,776,500BB).

In order to further reduce the pollutants which are emitted by the vehicle under cold running conditions, a so-called hydrocarbon trap (HCT) can be located in the exhaust gas purification system according to the invention, preferably in the TWC1. The HCT absorbs the emitted hydrocarbons from the exhaust gas at low temperatures of less than 200° C., preferably less than 250° C. (net absorption). The HCT may be associated with an oxidation catalyst. As such, platinum and/or rhodium and/or palladium may be considered. Particularly those from US20190351397AA, US20190351398AA or US20190351393AA come into consideration as embodiments and materials for the HCT. As a storage material, zeolites such as beta which are exchanged with a transition metal such as iron or copper are extremely preferably used.

It is also advantageous if a functionality for temporary storage of nitrogen oxides is present in the exhaust gas purification system according to the invention. This prevents excessive levels of unconverted nitrogen oxides from being emitted during so-called cold running phases of the vehicle. These are then stored and later, when sufficient temperature or reducing agent is available in the exhaust system, reduced either by reductive regeneration (so-called NOx storage catalysts; NSC) or by thermal desorption (passive NOx storage, PNA) and reduction over a three-way catalyst. With regard to the mode of action and the materials to be preferably used, reference is made to the relevant literature (WO2020058265A1; EP3695902A1; US2019120109AA; US2018318763AA; US2015266002AA; WO2019134958A1).

A subject matter of the present invention is also a method for purifying exhaust gases of a predominantly stoichiometrically operated internal combustion engine, in which the exhaust gas is passed through an exhaust gas purification system according to one of the preceding claims. The preferred and alternative embodiments mentioned for the system also apply mutatis mutandis to the method.

With the exhaust system and the proposed method according to the present invention, it is possible to be able to comply with the exhaust gas limits of future, even stricter emission standards. In addition to the standard values such as HC, CO, NOx, and soot, the system according to the invention also allows the reduction of so-called secondary pollutants, e.g. $NH_3$, $N_2O$ and others. Specifically, the arrangement of the TWC1 near the engine enables very high conversion rates for the emission-relevant pollutants CO, HC, and NOx. The additional TWC2 can optionally have a support effect and, especially at operating points with a high load and exhaust gas mass flows, can help to ensure high conversion rates of CO, HC, and NOx. By contrast, the use of the particle filter leads to significant deposition rates of soot, so that the given emission limits can be reliably met.

It is well known to the person skilled in the art that classic three-way catalysts can generate certain amounts of ammonia in the corresponding temperature regimes and engine operating points. Finally, the use of materials temporarily storing ammonia, for example in a separate catalyst substrate (KAT), ensures that especially secondary pollutants, such as ammonia, can additionally be significantly reduced. Such a system is thus predestined for use in automobiles which will have to comply with future strict exhaust gas limits for an approval.

FIGURES

FIG. 1: Here the typical concentration curve of an ammonia absorption measurement is shown.

Figure 2:
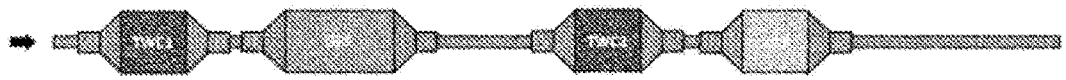

FIG. 2: Shows an embodiment of a system according to the invention with KAT downstream of the TWC2.

Figure 3:

FIG. 3: Shows an embodiment of a system according to the invention with KAT between GPF and TWC2.

Figure 4:
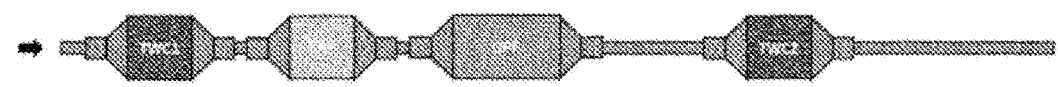

FIG. 4: Shows an embodiment of a system according to the invention with KAT upstream of the GPF.

Figure 5:
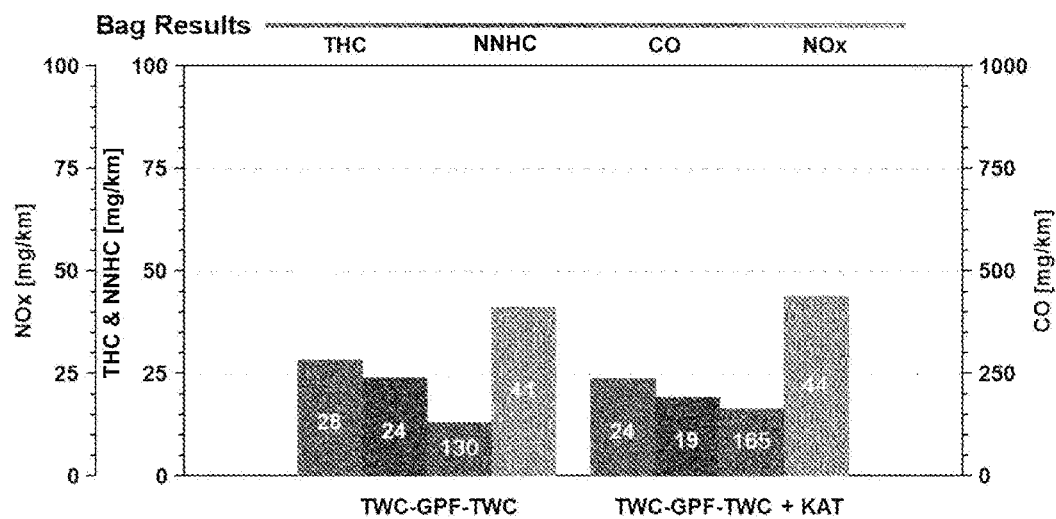

FIG. 5: Averaged bag emissions for THC/NHC/CO/NOx of the two exhaust gas aftertreatment systems TWC-GPF-TWC and TWC-GPF-TWC+KAT in comparison.

Figure 6:
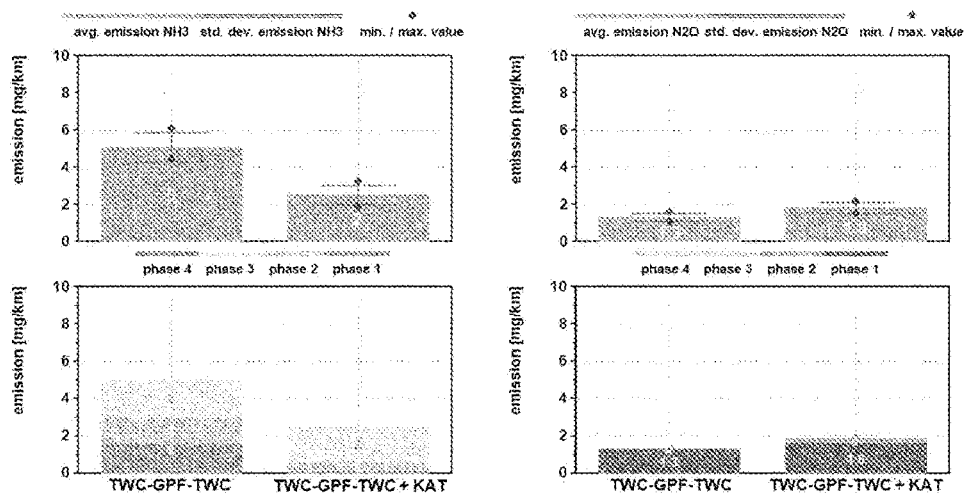

FIG. 6: Averaged emissions for $NH_3$ and $N_2O$ of the two exhaust gas aftertreatment systems TWC-GPF-TWC and TWC-GPF-TWC+KAT in comparison.

Figure 7:
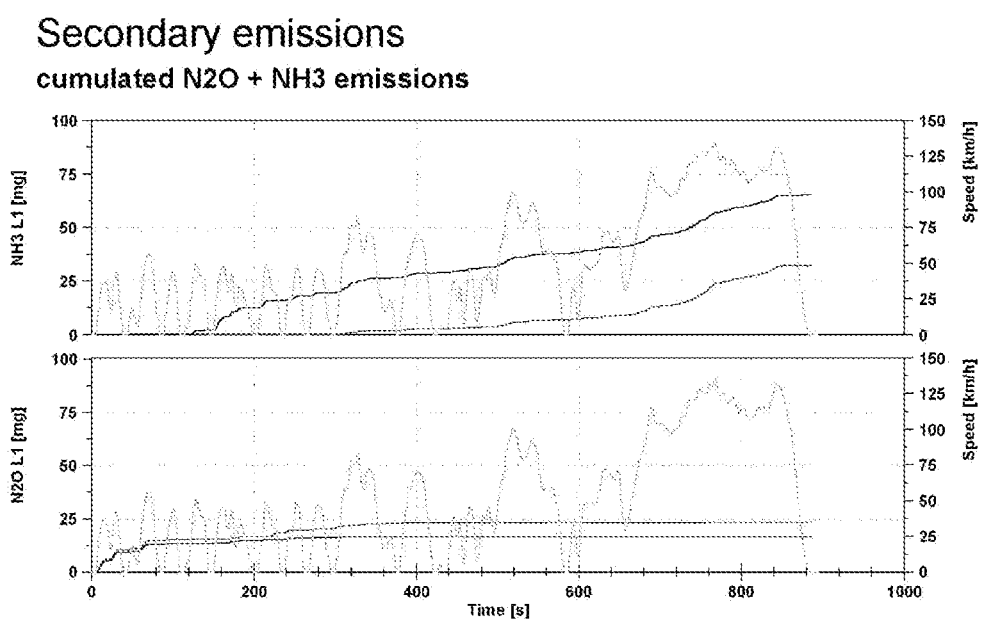

FIG. 7: Averaged cumulative modal curves of emissions for $NH_3$ and $N_2O$ of the two exhaust gas aftertreatment systems TWC-GPF-TWC (black) and TWC-GPF-TWC+KAT (blue) in comparison.

EXAMPLES

Determination of Ammonia Storage Capacity

It is determined experimentally in a flow tube reactor. In order to avoid undesirable ammonia oxidation on the reactor material, a reactor made of quartz glass is used. From the region of the catalyst whose ammonia storage capacity is to be determined, a drill core is taken as specimen. Preferably, a drill core 1 inch in diameter and 3 inches long is taken as the specimen. The drill core is inserted into the flow tube reactor and conditioned at a temperature of 600° C. in a gas atmosphere of 500 ppm nitrogen monoxide, 5% by volume of oxygen, 5% by volume of water, and remainder of nitrogen at a space velocity of 30,000 $h^{-1}$ for 10 minutes. Subsequently, in a gas mixture of 0% by volume of oxygen, 5% by volume of water, and remainder of nitrogen at a space velocity of 30,000 $h^{-1}$, the measuring temperature of 200° C. is started up. After stabilization of the temperature, the $NH_3$ storage phase is initiated by switching on a gas mixture of 450 ppm ammonia, 0% by volume of oxygen, 5% by volume of water, and remainder of nitrogen at a space velocity of 30,000 $h^{-1}$. This gas mixture is added until a stationary ammonia permeate concentration is registered downstream of the specimen. The mass of ammonia stored on the specimen is calculated from the recorded ammonia breakthrough curve by integrating from the start of the $NH_3$ storage phase until stationarity is reached, taking into account the measured steady-state $NH_3$ breakthrough concentration and the known volume flow (hatched area in FIG. 1). The ammonia storage capacity is calculated as quotient of the stored ammonia mass divided by the volume of the tested drill core.

Experimental Data

A Euro 6 gasoline vehicle with 1.5 L DI engine was tested with an exhaust system artificially aged to end-of-life consisting of a first TWC near the engine with 1.26 L catalyst volume (substrate dimensions 118.4 mm×114.3 mm) and a conventional three-way coating with 1.77 g/L noble metal (0/92/8 Pt/Pd/Rh), an uncoated GPF arranged downstream with 1.39 L catalyst volume (substrate dimensions 132.1 mm×101.6 mm), and a second TWC arranged in the underbody with 1.26 L catalyst volume (substrate dimensions 118.4 mm×114.3 mm) and a conventional three-way coating with 0.83 g/L noble metal (0/80/20 Pt/Pd/Rh) and run on a roller dynamometer in an RTS aggressive driving cycle. This system is referred to as a TWC-GPF-TWC reference system and has a total substrate volume of 3.9 L. The emissions THC, NNHC, CO, NOx, $NH_3$ and $N_2O$ were measured, the measuring technique to be used for this purpose is known to a person skilled in the art. The mean value from a plurality of measurements is shown in each case.

This was compared to a system according to the claims mentioned herein. For this purpose, the same Euro 6 gasoline vehicle with a 1.5 L DI engine was equipped with an exhaust system artificially aged to end-of-life consisting of a first TWC near the engine with a 1.26 L catalyst volume (substrate dimensions 118.4 mm×114.3 mm) and a conventional three-way coating with 1.77 g/L noble metal (0/92/8 Pt/Pd/Rh), an uncoated GPF arranged downstream with 1.39 L catalyst volume (substrate dimensions 132.1 mm×101.6 mm), a second TWC arranged in the underbody with 0.63 L catalyst volume (substrate dimensions 118.4 mm×57.2 mm) and a conventional three-way coating with 0.83 g/L noble metal (0/80/20 Pt/Pd/Rh), and a KAT arranged downstream therefrom with 0.63 L catalyst volume (substrate dimensions 118.4 mm×57.2 mm) and a coating which can additionally temporarily store ammonia, with 0.11 g/L noble metal (100/0/0 Pt/Pd/Rh). It was run on a roller dynamometer in an RTS aggressive driving cycle. This system is referred to as TWC-GPF-TWC+KAT and has a total substrate volume of 3.9 L. The emissions THC, NNHC, CO, NOx, $NH_3$ and $N_2O$ were measured, the measuring technique to be used for this purpose is known to a person skilled in the art. The mean value from a plurality of measurements is shown in each case.

FIG. 5 shows a comparable performance of the TWC-GPF-TWC+KAT system compared to the TWC-GPF-TWC reference system. FIG. 6 shows the so-called secondary emissions of $NH_3$ and $N_2O$, wherein the TWC-GPF-TWC+KAT system can reduce the $NH_3$ emissions by more than half, while $N_2O$ emissions increase only slightly. This behavior is even more evident in FIG. 7, which shows the averaged cumulative modal emissions for $NH_3$ and $N_2O$ over the entire driving cycle. This effect is achieved at the same total substrate volume of the two systems compared, i.e., with halved TWC2 of the TWC-GPF-TWC+KAT system compared to that of the TWC-GPF-TWC reference system. Therefore, with the same volume of TWC2 in both systems, an even greater advantage can be expected for the TWC-GPF-TWC+KAT system.

The invention claimed is:

1. An exhaust gas purification system for purifying exhaust gases of a predominantly stoichiometrically operated internal combustion engine, the system comprising: a TWC1 near to the engine on a flow-through substrate, a GPF attached downstream of the TWC1 as a wall-flow filter, and another TWC2 on a flow-through substrate downstream of the GPF, and the system additionally has materials for temporary storage of ammonia,
wherein the materials for temporary storage of ammonia are arranged on a separate flow-through substrate and the separate flow-through substrate is arranged downstream of the TWC2, and
wherein the separate flow-through substrate with the materials for temporary storage of ammonia accounts for a proportion of 5-30% by volume of the total volume of substrates in the exhaust gas purification system.

2. The system according to claim 1, wherein an ammonia storage capability is increased to at least 0.25 g of ammonia per L substrate volume by the additional materials.

3. The system according to claim 1, wherein the materials for temporary storage of ammonia are present in the system in an amount of 50-350 g/L substrate volume.

4. The system according to claim 1, wherein the materials for temporary storage of ammonia have materials selected from the group consisting of zeolites or zeolite-like materials.

5. The system according to claim 1, wherein the materials for temporary storage of ammonia also have catalysts for the oxidation of $NH_3$ to $N_2$.

6. The system according to claim 1, wherein the separate flow-through substrate with the materials for temporary storage of ammonia has a greater washcoat loading in g/L than the GPF.

7. The system according to claim 1, wherein at least one substrate can be electrically heated.

8. A method for purifying exhaust gases of a predominantly stoichiometrically operated internal combustion engine, the method comprising: passing the exhaust gas through the exhaust gas purification system according to claim 1.

* * * * *